United States Patent [19]
Billings

[11] Patent Number: 6,051,165
[45] Date of Patent: Apr. 18, 2000

[54] ELECTRON EMISSION MATERIALS AND COMPONENTS

[75] Inventor: Garth W. Billings, Santa Rosa, Calif.

[73] Assignee: Integrated Thermal Sciences Inc., Santa Rose, Calif.

[21] Appl. No.: 09/258,990

[22] Filed: Feb. 26, 1999

Related U.S. Application Data

[63] Continuation-in-part of application No. 08/925,842, Sep. 8, 1997, Pat. No. 5,911,919.
[51] Int. Cl.$^7$ .............................. H01B 1/02; H01B 1/06; H01J 1/00; H01J 1/02
[52] U.S. Cl. .............. 252/515; 252/519.12; 252/520.21; 313/326; 313/352
[58] Field of Search .......................... 252/515, 519.12, 252/520.21, 512; 313/326, 346 R, 346 DC, 353, 355

[56] References Cited

U.S. PATENT DOCUMENTS

| | | | |
|---|---|---|---|
| 5,118,984 | 6/1992 | Saito et al. .................. | 313/346 R |
| 5,284,614 | 2/1994 | Chen et al. .................. | 419/20 |
| 5,548,184 | 8/1996 | Choi et al. .................. | 313/346 R |
| 5,592,043 | 1/1997 | Gartner et al. .................. | 313/346 DC |
| 5,911,919 | 6/1999 | Billings .................. | 252/516 |
| 5,934,900 | 8/1999 | Billings .................. | 432/264 |

*Primary Examiner*—Yogendra Gupta
*Assistant Examiner*—John M Petruncio
*Attorney, Agent, or Firm*—Henry P. Sartorio

[57] ABSTRACT

Electron emission materials consisting of carbides, borides, and oxides, and related mixtures and compounds, of Group IVB metals Hf, Zr, and Ti, Group IIA metals Be, Mg, Ca, Sr, and Ba, and Group IIIB metals Sc, Y, and lanthanides La through Lu are used in electrodes. The electron emission materials include ternary Group IVB–IIIB and IVB–IIA oxides. These electron emission materials are typically contained in a refractory metal matrix formed of tungsten, tantalum, rhenium, and their alloys, but may also be used by themselves. These materials and electrodes have high melting points, low vapor pressures, low work functions, high electrical and thermal conductivity, and high thermionic electron emission and field emission properties.

14 Claims, 1 Drawing Sheet

ELECTRON EMISSION MATERIALS AND COMPONENTS

RELATED APPLICATIONS

This application is a continuation-in-part (CIP) of Ser. No. 08/925,842 filed Sep. 8, 1997, now U.S. Pat. No. 5,911,919.

BACKGROUND OF THE INVENTION

1. Field of the Invention

The present invention relates generally to electron emission materials and articles, and their methods of manufacture; and more particularly to materials and articles with high melting points, low vapor-pressures, high thermal and electrical conductivity, low work functions, and high photon and electron emission properties for use as electrodes in high intensity light sources, gas lasers, electron-beam lithography equipment, welding and plasma cutting torch applications, x-ray and microwave generators, and other electromagnetic apparatus.

2. Description of Related Art

In the field of high-power electronics, including lighting (arc-lamps, flash-lamps, and gas lasers), arc-welding and plasma-cutting, electron-beam lithography, and other instrumentation (e.g., electron microscopy, spectroscopy, x-ray generators), electrodes are used to provide high energy density streams of electrons. In the case of direct-current (DC) applications, the cathode is the negatively charged electrode and dispenses electrons to the positively charged anode that receives the electrons and conducts them away. In alternating-current (AC) applications, the electrodes alternate from being cathodes to anodes with the alternating current at different intervals, or frequencies. The stream of electrons produced from the cathode provides the energy necessary to perform work in the form of heating, electron emission, elemental or chemical ionization, or collisions to produce other forms of electromagnetic energy like x-rays, ultraviolet radiation, infrared radiation, and microwave radiation.

Electrode materials require good chemical, mechanical, and electrical properties to perform well for extended periods of time. Typically, DC arc-lamps and DC arc-welding electrodes are made of tungsten (W) and thoriated tungsten (e.g., W+2% $ThO_2$); DC flash-lamp electrodes are made of tungsten and porous tungsten that has been infiltrated with an emitter material like strontium barium calcium aluminate; for instruments like electron microscopes, the cathode is made of single crystal lanthanum hexaboride ($LaB_6$) or cerium hexaboride ($CeB_6$); and for other types of analytical instruments that use electron-beams, the cathodes, or field emission devices can be made of zirconiated tungsten (W+$ZrO_{2-x}$).

In the case of DC cathode applications (e.g., arc-lamps, arc-welding), thoriated tungsten is used almost exclusively. The cathodes are made of tungsten doped with approximately 2 percent thorium dioxide (W:2% $ThO_2$). Tungsten serves as the refractory metal-matrix which has a very high melting point, it is very electrically and thermally conductive, has reasonably good thermionic emission properties, yet has a work function of approximately 4.5eV when pure. Thorium dioxide (thoria) is the most refractory oxide ceramic material known (highest melting point and lowest vapor-pressure), and when properly added in small amounts (typically 1 to 3%) to tungsten, thoria aids in controlling the tungsten microstructural characteristics by "pinning" grain boundaries, thereby inhibiting exaggerated or non-uniform grain growth. Further, these characteristics, along with other properties provided by the thoria, lower the work function of the metal-ceramic system to approximately 2.7–3.0eV. The lower work function enables the W:2% $ThO_2$ cathode to emit thermionic electrons at lower temperatures and with less localized heating at the tip; thus, the thoriated tungsten electrode maintains its integrity longer than pure tungsten would without the thoria additive.

Recently, there has been much effort expended investigating alternative materials for replacing thoria in tungsten. This is due to the fact that thoria is radioactive and is considered a carcinogen (a hazardous material), its decay products are toxic, and it is likely to become a strictly regulated and controlled substance. Some headway is being made by doping tungsten with other oxides like lanthana ($La_2O_3$), yttria ($Y_2O_3$), ceria ($CeO_2$), and mixtures of these.

In the case of DC flash-lamp cathodes, these are typically called "dispenser" cathodes, and are made by infiltrating porous tungsten (approximately 80% dense, or 20% porosity) with mixed oxides in their molten state. Once cooled (frozen), the materials are machined to form the finished component. The oxides used generally consist of aluminates, and are engineered to not only have very low work functions with good electron emission, but reasonably low melting points for convenience in manufacturing. The term "dispenser cathode" is literally accurate in that they "boil-off" not only electrons, but the chemicals that make them-up. Some of the better-known aluminates are: barium calcium aluminate (in proportions: $3BaO:1CaO:1Al_2O_3$); barium strontium aluminate (in proportions $3BaO:0.25SrO:1Al_2O_3$); or other combinations of strontium oxide, barium oxide, calcium oxide, and aluminum oxide. These types of dispenser cathodes work well for the present-day applications, for the most part, yet in higher-power loadings, they sputter-off (caused from melting or boiling of the oxides) some of their constituents. These sputtered materials cause the inside of a flash-lamp envelope to become clouded (or dirty) thus lowering the output of light from the lamp. Also, "sputtering" is a form of erosion and is the primary cause of cathode and lamp (or instrument) failure.

In the case of analytical instruments like electron microscopes, these employ cathodes made of single crystal lanthanide hexaboride (e.g., $LaB_6$, $CeB_6$). Instruments such as these utilize thermionic electron-beams, generated at ≈1600° C., at very high voltages (10–20 kV) and very low current ($10^{-6}$ amp to $10^{-10}$ amp). These single crystal materials work well for certain applications, but are very expensive, and only one or two suppliers for these cathodes exist. Also, these single crystal cathodes are susceptible to thermal shock during cyclic, high power loadings. When tested in multi-kilowatt arc-lamps that run at low voltage (≈20V to 50V) and high current (50A to 100A), the $LaB_6$ materials cracked (shattered) due to thermal shock caused by very-rapid resistance heating. In addition to this example, single crystals and polycrystalline ceramics of binary carbides like zirconium carbide (ZrC), hafnium carbide (HfC), tantalum carbide (TaC), and others, have been experimented with for use as thermionic cathodes in analytical instruments. Although some of these have displayed promise for high voltage—low amperage applications, when these binary carbide materials were tested under cyclic, high-power loadings (multi-kilowatt, low voltage x high amperage), they consistently exhibited cracking and failure due to thermal shock; in addition, they are difficult to produce and expensive.

In the case of field emission devices used for electron-beam lithography and analytical instruments, the cathodes are sometimes made of tungsten that has been doped or coated with an emitter material like zirconium oxide, thus the term "zirconiated tungsten". These cathodes can be operated as "cold-field" emitters, or "hot-field" emitters, as the terms imply, one is operated at ambient temperatures where the other is heated (resistively) to an emission temperature of approximately 1800° C.

The different applications (short-arc lamps, long-arc flash-lamps, welding and cutting, and electron-beam analytical instruments, etc.) utilize different power supplies that produce different power loadings in the electrodes. The examples given above describe a few of low voltage—high amperage applications, and high voltage—low amperage applications. Each of these examples utilize different cathode materials and geometries.

There is a need for better materials and electrodes that offer higher performance and longer-life, with properties allowing for flexibility to be used in different types of electron emission applications.

SUMMARY OF THE INVENTION

Accordingly, it is an object of the invention to provide improved electrode materials and electrodes with high melting points, low vapor pressures, low work functions, high electrical and thermal conductivity, and high thermionic electron emission and field emission properties, for use in electron emission applications.

The invention is a class of improved electron emission materials and improved electrodes made of a refractory metal matrix containing the electron emission materials, or in some cases, made entirely of the electron emission materials. The refractory metal matrix serves as the electrically and thermally conductive host, and consists of metals including tungsten, molybdenum, tantalum, rhenium, and alloys or mixtures of these. The electron emission materials provide microstructural control characteristics, low work functions, and desirable electron emission properties and consist of carbides, borides, oxides, and mixtures of carbides, borides, oxides, of Group IVB elements selected from Hf, Zr, and Ti, carbides, borides, oxides, and mixtures of carbides, borides, oxides, of Group IIIB elements selected from Sc, Y, and the lanthanides La through Lu, combined or reacted with the above Group IVB compounds; and oxides and mixtures of oxides of Group IIA elements selected from Be, Mg, Ca, Sr, and Ba, combined or reacted with the above Group IVB compounds and/or Group IIIB compounds to form composite materials. Thus the electron emission materials of the invention encompass carbides, borides, oxides, and mixtures of carbides, borides, oxides, of the Group IVB, IIA, and IIIB elements, and mixtures and composites thereof. In particular, the electron emission materials of the invention, and electrodes formed therefrom, include ternary oxides of the Group IVB elements (Hf, Zr, Ti) with either the Group IIIB elements (Sc, Y, lanthanides La through Lu) or the Group IIA elements (Be, Mg, Ca, Sr, Ba), i.e. the IV–III oxides and the IV–II (or II–IV) oxides.

DETAILED DESCRIPTION OF THE INVENTION

Figure 1:
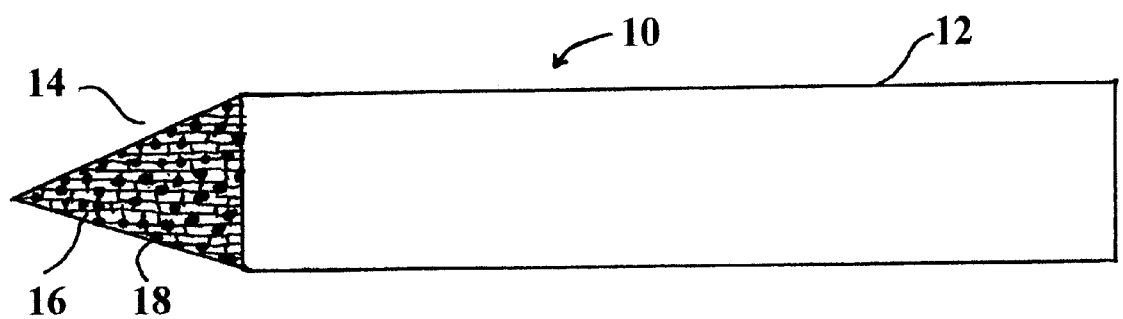
FIG. 1 is a sectional view of an electrode made of a refractory metal-matrix host containing electron emission materials.

According to the invention, a class of electron emission materials can be engineered and produced to provide desirable thermal, electrical, and other properties. These materials are used to form electrodes for a wide variety of applications. Preferably the electrodes are formed of a refractory metal matrix containing the electron emission materials, but in some cases the electrode may be formed entirely of the electron emission material. The refractory metal matrix host metals comprise: tungsten, molybdenum, tantalum, rhenium, and/or alloys of these. The electron emission materials of the invention comprise: 1) Group IVB element (M=Hf, Zr, or Ti) carbides ($M_xC_y$), Group IVB borides ($M_xB_z$), and mixtures of Group IVB carbides and Group IVB borides ($M_xC_y:M_xB_z$). 2). Group IIIB element (M'=Sc, Y, and lanthanides La through Lu) carbides ($M'_xC_y$). Group IIIB borides ($M'_xB_z$), and mixtures of Group IIB carbides and Group IIIB borides ($M'_xC_y:M'_xB_z$). 3) The above Group IIIB carbides, and Group IIIB borides, can be combined or reacted with the above Group IVB carbides and Group IVB borides to form composites with single ternary phases or multiple phases and stoichiometries ($M_{x1}M'_{x2}C_y$, $M_{x1}M'_{x2}B_z$, $M_{x1}M'_{x2}C_yB_z$). 4) Group IVB element (M=Hf, Zr, or Ti) oxides ($MO_2$) combined or reacted with Group IIIB element (M'=Sc, Y, or a lanthanide La through Lu) oxide ($M'_2O_3$) to from mixtures of binary compounds ($MO_2:M'_2O_3$) or ternary compounds ($M_{x1}M'_{x2}O_y$). 5) Group IIA element (M"=Be, Mg, Ca, Sr, or Ba) oxides (M"O) combined or reacted with Group IVB oxides ($MO_2$) to form mixtures of binary compounds ($MO_2:M"O$) or ternary compounds ($M"MO_3$). 6) The above Group IIA oxides (M"O) combined or reacted with Group IIIB oxides ($M'_2O_3$) to form mixtures of binary compounds ($M"O:M'_2O_3$) or ternary compounds ($M"M'_2O_4$). 7) Composites consisting of oxides or mixtures of oxides from the above Group IVB, IIA, and IIIB oxides are encompassed by the general formula $M_{x1}M'_{x2}M"_{x3}O_y$ where each of x1, x2, x3, y>0. The ternary IV–III and IV–II oxides are encompassed by the same general formula where one of x2, x3=0. 8) Metal-electron emission material composites consisting of refractory metal-matrix host materials where the refractory metal host consists of tungsten, molybdenum, tantalum, rhenium, or alloys of these, with the above Group IVB, IIA, and IIIB electron emission materials.

More specifically, one preferred metal-electron emission material electrode utilizes a refractory metal-matrix host, preferably tungsten (W), doped with or containing Group IVB carbide materials having a general formula $M_xC_y$ where M is Hf, Zr, or Ti, and C is carbon. Metal-electron emission materials where the refractory metal host represents at least 70 weight percent and the electron emission material represents no more than 30 weight percent, are preferred. Illustrative materials include W:30% HfC to W:1% HFC compositions.

More specifically, a second preferred metal-electron emission material electrode utilizes a refractory metal-matrix host, preferably tungsten (W), doped with or containing Group IVB boride materials having a general formula $M_xB_z$ where M is Hf, Zr, or Ti, and B is boron. Metal-electron emission materials where the refractory metal host represents at least 70 weight percent and the electron emission material represents no more than 30 weight percent, are preferred. Illustrative materials include W:30% $HfB_2$ to W:1% $HfB_2$ compositions.

More specifically, a third preferred metal-electron emission material electrode utilizes a refractory metal-matrix host, preferably tungsten (W), doped with or containing Group IIIB boride materials having a general formula $M'_xB_z$ where M' is Sc, Y, or lanthanides La through Lu, and B is boron. Metal-electron emission materials where the refractory metal host represents at least 70 weight percent and the electron emission material represents no more than 30 weight percent, are preferred. Illustrative materials include W:30% $LaB_6$ to W:1% $LaB_6$, W:30% $GdB_6$ to W:1% $GdB_6$, and W:30% $YB_6$ to W:1% $YB_6$ compositions.

More specifically, a fourth metal-electron emission material electrode utilizes a refractory metal-matrix host, preferably tungsten (W), doped with or containing ternary compounds or mixtures of Group IVB boride and Group IIIB boride materials having a general formula $M_{x1}M'_{x2}B_z$ or $M_xB_2:M'_{x2}B_z$ where M is Hf, Zr, or Ti, M' is Sc, Y, or lanthanides La through Lu, and B is boron. Metal-electron emission materials where the refractory metal host represents at least 70 weight percent and the electron emission material represents no more than 30 weight percent, are preferred. Illustrative materials include W-30% $HfGdB_6$ to W:1% $HfGdB_6$, or W:30% $HfB_2GdB_6$ to W:1% $HfB_2GdB_6$ compositions.

More specifically, a fifth metal-electron emission material electrode utilizes a refractory metal-matrix host, preferably tungsten (W), doped with or containing electron emission materials of the Group IVB oxides reacted with Group hIIB oxides to form ternary compounds with the general formula $M_{x1}M'_{x2}O_y$ where M is Hf, Zr, or Ti, M' is Sc, Y, or a lanthanide La through Lu, and O is oxygen. Metal-electron emission materials where the refractory metal host represents at least 70 weight percent and the electron emission material represents no more than 30 weight percent, are preferred. Illustrative materials include W:30% $HfCeO_4$ to W:1% $HfCeO_4$, W:30% $Hf_2La_2O_7$ to W:1% $Hf_2La_2O_7$, W:30% $Hf_7Y_2O_{17}$ to W:1% $Hf_7Y_2O_{17}$, and W:30% $HfLa_2O_5$ to W:1% $Hfta_2O_5$ compositions.

More specifically, a sixth metal-electron emission material electrode utilizes a refractory metal-matrix host, preferably tungsten (W), doped with or containing electron emission materials of the Group IIA oxides reacted with Group IVB oxides to form ternary compounds with the general formula $M"MO_3$ where M" is Be, Mg, Ca, Sr, or Ba, M is Hf, Zr, or Ti, and O is oxygen. Metal-electron emission materials where the refractory metal host represents at least 70 weight percent and the electron emission material represents no more than 30 weight percent, are preferred. Illustrative materials include W:30% $SrHfO_3$ to W:1% $SrHfO_3$, and W:30% $BaHfO_3$ to W:1% $BaHfO_3$ compositions.

The fifth and sixth preferred metal-electron emission material electrodes generally utilize a refractory metal-matrix host, preferably tungsten (W), doped with a ternary Group IVB-Group IIIB or IIA oxide with the general formula $M_{x1}M'_{x2}M"_{x3}O_y$ where x1>0, one of x2 and x3>0 and the other=0, and y>0.

More specifically, a seventh preferred metal-electron emission material electrode utilizes a refractory metal-matrix host, preferably tungsten (W), doped with mixtures or ternary compounds of the Group IIIB oxides and Group IIA oxides with the general formula $M'_{x2}O:M"_{x3}O_y$ or $M'_{x2}M"_{x3}O_y$ where M' is Sc, Y, or lanthanide La through Lu, M" is Be, Mg, Ca, Sr, or Ba, and O is oxygen. Metal-electron emission materials where the refractory metal host represents at least 70 weight percent and the electron emission material represents no more than 30 weight percent, are preferred. Illustrative materials include W:30% $Dy_{x2}Sr_{x3}O_y$ to W:1% $Dy_{x2}Sr_{x3}O_y$ and W:30% $Er_{x2}Ba_{x3}O_y$ to W:1% $Er_{x2}Ba_{x3}O_y$ compositions.

More specifically, a eighth metal-electron emission material electrode utilizes a refractory metal-matrix host, preferably tungsten (W), doped with mixtures or quaternary compounds of the Group IVB oxides, Group IIIB oxides, and Group IIA oxides with the general formula $M_{x1}O_{y1}:M'_{x2}O_{y2}:M"_{x3}O_{y3}$ or $M_{x1}M'_{x2}M"_{x3}O_y$ where M is Hf, Zr, or Ti, M' is Sc, Y, or lanthanides La through Lu, M" is Be, Mg, Ca, Sr, or Ba, and O is oxygen. Metal-electron emission materials where the refractory metal host represents at least 70 weight percent and the electron emission material represents no more than 30 weight percent, are preferred. Illustrative materials include W:30% $Hf_{x1}Dy_{x2}Sr_{x3}O_y$ to W: 1% $Hf_{x1}Dy_{x2}Sr_{x3}O_y$ compositions.

The metal-electron emission materials are selected based upon the requirements of the application and mixed according to the properties required, i.e., melting points, vapor-pressures, work functions, thermal conductivity or resistivity, or electrical conductivity or resistivity, and resistance to environmental conditions.

These metal-electron emission materials can be made by a variety of different techniques, including but not limited to conventional ceramic technology combined with conventional powder metallurgical technology. There are typically 6 steps, 1) preparing the electron emission materials with fine particle size powder (e.g., $\leq 5$ μm); 2) blending the appropriate amount of the ceramic additive powders with high purity, small particle size tungsten powders or other refractory metal powders (e.g., $\leq 10$ μm); 3) consolidating the blended powders into rod-form (or other desired shape) by either high-pressure, isostatic pressing or hydraulic pressing; 4) high temperature sintering of the rod-forms to desired density; 5) swaging or forging the rods into straight, higher density, smaller diameter form; 6) machining the rod-forms into the finished dimensions of the electrode components. In some cases, some steps may be eliminated or added. The electron emission materials may be synthesized or it may be purchased, if available. In addition, the electrodes may be formed utilizing other techniques such as injection molding, sintering and machining.

As an illustration, the preferred IV–III and IV–II (or II–IV) ternary oxide materials can be prepared as follows by reacting powders (e.g. 0.1–3 μm) of the binary oxides. Different stoichiometries can be produced by varying the relative ratios of the binary oxides.

| Reaction | Ratio |
|---|---|
| $HfO_2 + CeO_2 \longrightarrow HfCeO_4$ | (1:1 ratio of binary oxides) |
| $2HfO_2 + La_2O_3 \longrightarrow Hf_2La_2O_7$ | (2:1 ratio of binary oxides) |
| $7HfO_2 + Y_2O_3 \longrightarrow Hf_7Y_2O_{17}$ | (7:1 ratio of binary oxides) |
| $HfO_2 + La_2O_3 \longrightarrow HfLa_2O_5$ | (1:1 ratio of binary oxides) |
| $BaO + HfO_2 \longrightarrow BaHfO_3$ | |
| $SrO + HfO2 \longrightarrow SrHfO_3$ | |

The ternary oxides are crushed into powders (e.g. 0.5–10 μm), added (1–30 wt %) to W powder, and pressed and sintered into rods.

Figure 2:
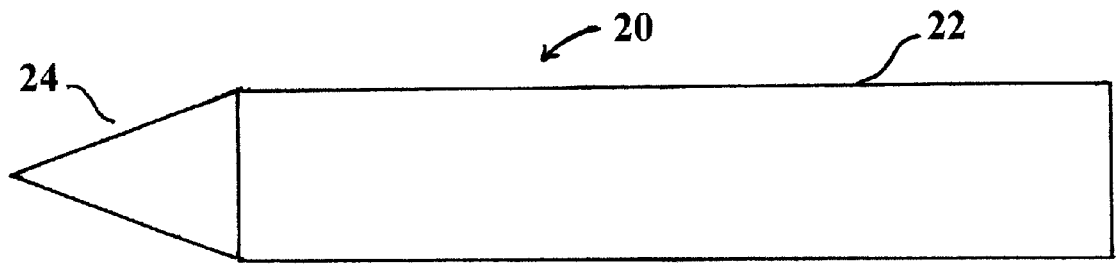
FIG. 2 is a sectional view of an alternate electrode made entirely of the electron emission materials.

An electrode 10 according to the invention is shown in FIG. 1 and is formed of a host refractory metal matrix (e.g., W) containing a carbide, boride, oxide, mixed carbide and mixed boride, or mixed oxide electron emission material (e.g., $HfGdB_6$) of the invention. Electrode 10 has a body 12 with a tapered tip 14. As illustrated in the tip 14, electrode 10 is made up of refractory metal grains 16 and electron emission material grains 18. An alternate electrode 20 comprising body 22 with tip 24 is shown in FIG. 2 and is formed entirely of the electron emission material.

Changes and modifications in the specifically described embodiments can be carried out without departing from the scope of the invention which is intended to be limited only in scope of the appended claims.

What is claimed is:

1. A composite electron emission material, comprising:
   a refractory metal matrix selected from the group consisting of tungsten, molybdenum, tantalum, rhenium, and mixtures and alloys thereof;
   an electron emission material contained in the refractory metal matrix, the electron emission material being selected from the group consisting of ternary oxides of a Group IVB element selected from Hf, Zr, and Ti, and a Group IIIB element selected from Sc, Y, and the lanthanides La through Lu, or of a Group IVB element selected from Hf, Zr, and Ti, and a Group IIA element selected from Be, Mg, Ca, Sr, and Ba.

2. The composite electron emission material of claim 1 wherein the electron emission material comprises a Group IVB element (M=Hf, Zr, or Ti) and a Group IIIB element (M'=Sc, Y, or a lanthanide La through Lu) ternary oxide ($M_{x1}M'_{x2}O_y$).

3. The composite electron emission material of claim 1 wherein the electron emission material comprises a Group IVB element (M=Hf, Zr, or Ti) and a Group IIA element (M"=Be, Mg, Ca, Sr, or Ba) ternary oxide ($M_{x1}M''_{x3}O_y$).

4. The composite electron emission material of claim 1 wherein the composite electron emission material comprises a material selected from the group consisting of W:30% $HfCeO_4$ to W:1% $HfCeO_4$, W:30% $Hf_2La_2O_7$ to W:1% $Hf_2La_2O_7$, W:30% $Hf_7Y_2O_{17}$ to W:1% $Hf_7Y_2O_{17}$, and W:30% $HfLa_2O_5$ to W:1% $HfLa_2O_5$.

5. The composite electron emission material of claim 1 wherein the refractory metal comprises at least 70 weight percent of the composite electron emission material.

6. An article of manufacture comprising an electrode formed of a composite electron emission material, the composite material comprising:
   a refractory metal matrix selected from the group consisting of tungsten, molybdenum, tantalum, rhenium, and mixtures and alloys thereof;
   an electron emission material contained in the refractory metal matrix, the electron emission material being selected from the group consisting of ternary oxides of a Group IVB element selected from Hf, Zr, and Ti, and a Group IIIB element selected from Sc, Y, and the lanthanides La through Lu, or of a Group IVB element selected from Hf, Zr, and Ti, and a Group IIA element selected from Be, Mg, Ca, Sr, and Ba.

7. The composite electron emission material of claim 6 wherein the electron emission material comprises a Group IVB element (M=Hf, Zr, or Ti) and a Group IIIB element (M'=Sc, Y, or a lanthanide La through Lu) ternary oxide ($M_{x1}M'_{x2}O_y$).

8. The composite electron emission material of claim 6 wherein the electron emission material comprises a Group IVB element (M=Hf, Zr, or Ti) and a Group IIA element (M"=Be, Mg, Ca, Sr, or Ba) ternary oxide ($M_{x1}M''_{x3}O_y$).

9. The composite electron emission material of claim 6 wherein the composite electron emission material comprises a material selected from the group consisting of W:30% $HfCeO_4$ to W:1% $HfCeO_4$, W:30% $Hf_2La_2O_7$ to W:1% $Hf_2La_2O_7$, W:30% $Hf_7Y_2O_{17}$ to W:1% $Hf_7Y_2O_{17}$, and W:30% $HfLa_2O_5$ to W:1% $HfLa_2O_5$.

10. The composite electron emission material of claim 6 wherein the refractory metal comprises at least 70 weight percent of the composite electron emission material.

11. An article of manufacture comprising an electrode formed of an electron emission material, the electron emission material comprising:
    a material selected from the group consisting of ternary oxides of a Group IVB element selected from Hf, Zr, and Ti, and a Group IIIB element selected from Sc, Y, and the lanthanides La through Lu, or of a Group IVB element selected from Hf, Zr, and Ti, and a Group IIA element selected from Be, Mg, Ca, Sr, and Ba.

12. The composite electron emission material of claim 11 wherein the electron emission material comprises a Group IVB element (M=Hf, Zr, or Ti) and a Group IIIB element (M'=Sc, Y, or a lanthanide La through Lu) ternary oxide ($M_{x1}M'_{x2}O_y$).

13. The composite electron emission material of claim 11 wherein the electron emission material comprises a Group IVB element (M=Hf, Zr, or Ti) and a Group IIA element (M"=Be, Mg, Ca, Sr, or Ba) ternary oxide ($M_{x1}M''_{x3}O_y$).

14. The composite electron emission material of claim 11 wherein the composite electron emission material comprises a material selected from the group consisting of W:30% $HfceO_4$ to W:1% $HfCeO_4$, W:30% $Hf_2La_2O_7$ to W:1% $Hf_2La_2O_7$, W:30% $Hf_7Y_2O_{17}$ to W:1% $Hf_7Y_2O_{17}$, and W:30% $HfLa_2O_5$ to W:1% $HfLa_2O_5$.

* * * * *